(12) United States Patent
Yang et al.

(10) Patent No.: US 11,658,498 B2
(45) Date of Patent: May 23, 2023

(54) CHARGEABLE GUNSIGHT BRACKET AND GUNSIGHT HAVING THE SAME

(71) Applicant: ZHUHAI MEFO OPTICAL INSTRUMENTS CO., LTD., Zhuhai (CN)

(72) Inventors: Hui Yang, Zhuhai (CN); Dayun Lin, Zhuhai (CN); Xiping Yu, Zhuhai (CN); Yinquan He, Zhuhai (CN)

(73) Assignee: ZHUHAI MEFO OPTICAL INSTRUMENTS CO., LTD., Zhuhai (CN)

( * ) Notice: Subject to any disclaimer, the term of this patent is extended or adjusted under 35 U.S.C. 154(b) by 188 days.

(21) Appl. No.: 17/424,504

(22) PCT Filed: Dec. 8, 2020

(86) PCT No.: PCT/CN2020/134387
§ 371 (c)(1),
(2) Date: Jul. 21, 2021

(87) PCT Pub. No.: WO2021/121070
PCT Pub. Date: Jun. 24, 2021

(65) Prior Publication Data
US 2022/0140629 A1 May 5, 2022

(30) Foreign Application Priority Data
Dec. 16, 2019 (CN) .......................... 201911289925.1

(51) Int. Cl.
*F41G 1/34* (2006.01)
*F41G 11/00* (2006.01)
(Continued)

(52) U.S. Cl.
CPC ............ *H02J 7/0045* (2013.01); *F41G 1/345* (2013.01); *F41G 11/003* (2013.01); *G02B 27/34* (2013.01);
(Continued)

(58) Field of Classification Search
CPC .... H02J 7/0045; H01M 50/247; H01M 10/46; H01M 2220/30; F41G 1/345; F41G 11/003; G02B 27/34
See application file for complete search history.

(56) References Cited

U.S. PATENT DOCUMENTS

| | | | | |
|---|---|---|---|---|
| 4,152,754 A | * | 5/1979 | deFilippis | F41G 11/003 42/117 |
| 4,940,324 A | * | 7/1990 | Nichols | F41G 1/30 356/247 |

(Continued)

*Primary Examiner* — Michelle Clement
(74) *Attorney, Agent, or Firm* — Bayramoglu Law Offices LLC

(57) ABSTRACT

A chargeable gunsight bracket and a gunsight having the same are provided. The gunsight bracket includes a bracket body, a chargeable battery, and a power supply circuit board electrically connected to the chargeable battery. A bottom of the bracket body is provided with a groove, and the bracket body is further provided with a battery holder and a charging interface. The power supply circuit board and the chargeable battery are both mounted in the battery holder, two ends of the charging interface are respectively connected to the power supply circuit board and external environment. The chargeable gunsight bracket is fixedly mounted on a gun through the groove, and the chargeable battery is mounted in the battery holder. When power of the chargeable bracket is running out, the external power supply can directly charge the chargeable battery through the charging interface, so that the gunsight can be used continuously.

15 Claims, 3 Drawing Sheets

(51) Int. Cl.
*G02B 27/34* (2006.01)
*H02J 7/00* (2006.01)
*H01M 50/247* (2021.01)
*H01M 10/46* (2006.01)

(52) U.S. Cl.
CPC ......... *H01M 10/46* (2013.01); *H01M 50/247* (2021.01); *H01M 2220/30* (2013.01)

(56) References Cited

U.S. PATENT DOCUMENTS

| | | | |
|---|---|---|---|
| 5,033,219 A * | 7/1991 | Johnson | F41G 1/35 42/126 |
| 5,584,137 A * | 12/1996 | Teetzel | F41A 9/62 42/117 |
| 7,421,818 B2 | 9/2008 | Houde-Walter | F41G 11/003 42/146 |
| 7,634,866 B2 * | 12/2009 | Javorsky | F41G 1/12 42/111 |
| 7,866,083 B2 * | 1/2011 | Teetzel | F41G 1/35 42/117 |
| 7,982,858 B2 * | 7/2011 | Holmberg | F41C 27/00 356/5.01 |
| 8,220,946 B1 * | 7/2012 | Teetzel | F41G 11/003 89/200 |
| 8,312,666 B2 * | 11/2012 | Moore | F41G 1/35 42/117 |
| 8,317,100 B2 * | 11/2012 | Windauer | F41G 3/06 235/404 |
| 8,371,729 B2 * | 2/2013 | Sharrah | F41G 1/35 362/439 |
| 8,567,981 B2 * | 10/2013 | Finnegan | F41G 1/35 42/117 |
| 8,944,626 B2 * | 2/2015 | Matthews | F21V 23/0414 362/112 |
| 9,057,584 B2 * | 6/2015 | Chung | F41G 1/16 |
| 9,062,933 B1 * | 6/2015 | Allen | F21V 21/34 |
| 9,146,077 B2 * | 9/2015 | Moore | F41G 1/35 |
| 9,297,614 B2 * | 3/2016 | Moore | F41G 1/35 |
| 9,383,167 B1 * | 7/2016 | Connolly | F41G 11/003 |
| 9,423,212 B2 * | 8/2016 | Campean | F41G 1/345 |
| 9,506,723 B2 * | 11/2016 | Teetzel | F41G 1/473 |
| 9,696,111 B2 * | 7/2017 | Saadon | F41C 23/12 |
| 9,772,163 B2 * | 9/2017 | Sharrah | H05B 45/3725 |
| 9,857,143 B2 * | 1/2018 | Teetzel | F41G 1/35 |
| 9,958,234 B2 * | 5/2018 | Campean | F41G 1/30 |
| 9,982,965 B2 * | 5/2018 | Sun | F41G 1/345 |
| 9,991,062 B2 * | 6/2018 | Zimmer | H01H 9/0235 |
| 10,042,243 B1 * | 8/2018 | Metayer | H04N 23/51 |
| 10,086,527 B2 * | 10/2018 | Teetzel | F41G 11/003 |
| 10,254,085 B2 * | 4/2019 | Willmann | F41G 11/004 |
| 10,267,594 B2 * | 4/2019 | Saadon | F41C 23/12 |
| 10,323,904 B1 * | 6/2019 | Batten | F41G 3/145 |
| 10,337,829 B2 * | 7/2019 | Spielberger | F41G 1/35 |
| 10,386,160 B2 * | 8/2019 | Bigby | F41G 11/001 |
| 10,495,398 B2 * | 12/2019 | Kramer | F41A 17/063 |
| 10,529,961 B2 * | 1/2020 | Jernigan | H01M 50/24 |
| 10,551,149 B2 * | 2/2020 | Teetzel | F41C 23/16 |
| 10,557,687 B2 * | 2/2020 | Teetzel | F41G 1/34 |
| 10,634,455 B2 * | 4/2020 | Galli | F41G 11/003 |
| 10,655,928 B2 * | 5/2020 | Chambers | H02J 7/0048 |
| 10,663,261 B2 * | 5/2020 | Summerfield | F41G 11/003 |
| 10,782,101 B2 * | 9/2020 | Sabaldan Elpedes | F41G 1/30 |
| 10,837,737 B1 * | 11/2020 | Wright | F41G 1/08 |
| 10,845,166 B2 * | 11/2020 | Campbell | F41G 1/545 |
| 10,876,814 B1 * | 12/2020 | Visser | F41C 23/22 |
| 10,942,005 B2 * | 3/2021 | Teetzel | F41G 1/35 |
| 11,060,820 B2 * | 7/2021 | Zimmer | F41G 11/003 |
| 11,067,363 B2 * | 7/2021 | Galli | F41G 11/003 |
| 11,098,980 B2 * | 8/2021 | Heath | F41G 1/30 |
| 11,105,590 B2 * | 8/2021 | Bigby | F41G 11/001 |
| 11,150,051 B2 * | 10/2021 | Connolly | F41G 1/30 |
| 11,168,961 B2 * | 11/2021 | Sabaldan Elpedes | F41G 11/003 |
| 11,287,638 B2 * | 3/2022 | DeAngelis | F41G 1/345 |
| 11,408,710 B2 * | 8/2022 | York | H01M 50/247 |
| 11,435,162 B2 * | 9/2022 | Heath | F41G 11/001 |
| 11,449,003 B2 * | 9/2022 | Heath | G02B 27/34 |
| 11,454,470 B2 * | 9/2022 | McClellan | F41G 3/06 |
| 11,473,763 B2 * | 10/2022 | Mock | F21L 4/00 |
| 2007/0068058 A1 * | 3/2007 | Remo | F41G 1/32 42/122 |
| 2007/0277422 A1 * | 12/2007 | Ding | F41G 11/003 42/146 |
| 2013/0036646 A1 * | 2/2013 | Rubac | F41C 23/22 42/90 |
| 2013/0104438 A1 * | 5/2013 | Hines | F41G 11/003 42/84 |
| 2013/0148367 A1 * | 6/2013 | Sharrah | F16B 7/00 362/396 |
| 2014/0092588 A1 * | 4/2014 | Toman | F41G 11/003 42/114 |
| 2014/0305022 A1 * | 10/2014 | Chung | F41G 1/387 42/113 |
| 2014/0322673 A1 * | 10/2014 | Uhr | F41A 35/00 434/21 |
| 2015/0128472 A1 * | 5/2015 | Theisinger | F41G 1/38 42/122 |
| 2015/0198415 A1 * | 7/2015 | Campean | F41G 1/30 42/137 |
| 2015/0308787 A1 * | 10/2015 | Cheng | F41G 1/35 42/126 |
| 2016/0018185 A1 * | 1/2016 | Makohon | F41C 27/00 42/90 |
| 2016/0033232 A1 * | 2/2016 | Cheng | F41G 1/345 42/114 |
| 2016/0102943 A1 * | 4/2016 | Teetzel | F41G 1/35 42/113 |
| 2017/0205194 A1 * | 7/2017 | Teetzel | F41G 1/26 |
| 2020/0025516 A1 * | 1/2020 | Mok | F41G 1/30 |
| 2020/0200508 A1 * | 6/2020 | Teetzel | F41G 1/36 |
| 2021/0172704 A1 * | 6/2021 | Nackel | G02B 23/105 |
| 2022/0120533 A1 * | 4/2022 | Teetzel | F41G 3/08 |
| 2022/0140629 A1 * | 5/2022 | Yang | F41G 11/003 42/131 |
| 2022/0178653 A1 * | 6/2022 | Connolly | F41G 1/387 |
| 2022/0221944 A1 * | 7/2022 | Patel | F41G 11/003 |
| 2022/0307798 A1 * | 9/2022 | Campbell | F41G 1/345 |
| 2022/0341697 A1 * | 10/2022 | Cabahug | F41A 35/00 |
| 2022/0412695 A1 * | 12/2022 | Teetzel | F41C 27/00 |
| 2023/0046334 A1 * | 2/2023 | Arbouw | F41A 17/08 |
| 2023/0054268 A1 * | 2/2023 | Schulte | F41G 1/30 |

* cited by examiner

CHARGEABLE GUNSIGHT BRACKET AND GUNSIGHT HAVING THE SAME

CROSS REFERENCES TO THE RELATED APPLICATIONS

This application is the national phase entry of International Application No. PCT/CN2020/134387, filed on Dec. 8, 2020, which is based upon and claims priority to Chinese Patent Application No. 201911289925.1, filed on Dec. 16, 2019, the entire contents of which are incorporated herein by reference.

TECHNICAL FIELD

The present invention relates to the technical field of a sighting device, and particularly relates to a chargeable gunsight bracket and a gunsight having the same.

BACKGROUND

At present, in order to ensure target aim accuracy in a strong light environment, it is necessary to increase the brightness of an aiming point or an aiming reticle through an LED light source. For example, the Chinese utility model patent with the patent number of ZL201320820391.2 discloses a red dot sight, which includes a housing, a brightness control member mounted on the housing, and a battery, wherein the battery provides power for the light source to generate a red dot with certain brightness for aiming. When the battery power is used up, it is necessary to remove a battery cover to replace the battery. Moreover, the existing battery used in a sight is a button battery, which has a relatively small capacity, resulting in that the sight's battery needs to be replaced frequently. This not only wastes time, but is also inconvenient for the user.

SUMMARY

The technical problem to be solved by the present invention is to provide a chargeable gunsight bracket, which can charge a gunsight mounted thereon.

Correspondingly, another technical problem to be solved by the present invention is to provide a gunsight, which can charge an internal battery thereof without disassembling a battery mounting device.

In terms of a chargeable gunsight bracket, the technical solution adopted by the present invention is as follows. A chargeable gunsight bracket includes a bracket body for mounting a gunsight, a chargeable battery, and a power supply circuit board electrically connected to the chargeable battery. A bottom of the bracket body is provided with a groove for receiving a guide rail of a gun, the bracket body is further provided with a battery holder and a charging interface, and the battery holder and the charging interface are both located above the groove. The power supply circuit board and the chargeable battery are both mounted in the battery holder, one end of the charging interface is electrically connected to the power supply circuit board, and the other end of the charging interface is communicated with an external environment for connecting to an external power supply.

Compared with the prior art, the chargeable gunsight bracket is fixed on the gun through the groove, the chargeable battery is mounted in the battery holder, and the chargeable battery is electrically connected to the power supply circuit board, so that the charging interface, the power supply circuit board and the chargeable battery form a chargeable and dischargeable power supply module. When the power of the chargeable battery is running out, the external power supply (such as a portable power source) can directly charge the chargeable battery through the charging interface, so that the gunsight mounted on the gunsight bracket can be used continuously. In this process, it is unnecessary to disassemble the gunsight bracket, which not only saves the disassembly time, but also provides a greater convenience to the user without replacing the battery.

Further, the charging interface is one selected from the group consisting of a micro USB interface, a Type-C interface, a 30-PIN interface and a lightning interface.

Further, the power supply circuit board has a constant voltage-constant current module and a protection module.

Further, the bracket body is further provided with a waterproof port communicated with the external environment, and the charging interface is communicated with the external environment through the waterproof port. The gunsight bracket further includes a waterproof plug, and the waterproof plug is inserted into the waterproof port to prevent water from entering the charging interface.

Further, an outer surface of the waterproof plug is provided with a first sealing ring, and the waterproof plug is connected to the waterproof port through the first sealing ring.

Further, the waterproof plug is provided with a handle, and the handle extends out of the bracket body to facilitate pulling out the waterproof plug.

Further, the handle is made of a magnetic material, one end of the handle is hinged to a surface of the waterproof plug toward the external environment, and the bracket body is provided with a magnet attracted by and connected to the other end of the handle.

Further, a peripheral surface of the bracket body is also provided with at least one LED lamp, and the LED lamp is electrically connected to the power supply circuit board.

Further, the LED lamp is a two-color LED lamp.

In terms of the gunsight, the technical solution adopted by the present invention is as follows. A gunsight includes a mirror body, a light source module arranged in the mirror body, and the above chargeable gunsight bracket. The mirror body is connected to the bracket body, and the light source module is electrically connected to the power supply circuit board.

In another embodiment, the bracket body of the chargeable gunsight bracket includes an upper bracket body and a lower bracket body, and the upper bracket body and the lower bracket body are detachably connected. The battery holder includes an upper holding chamber and a lower holding chamber respectively arranged on the upper bracket body and the lower bracket body. The charging interface is arranged on the upper bracket body, the groove is arranged on the lower bracket body, and the power supply circuit board is mounted in the upper holding chamber.

Further, the gunsight bracket further includes a second sealing ring surrounding the battery holder, and the second sealing ring is located between the upper bracket body and the lower bracket body. When the upper bracket body is connected to the lower bracket body, the upper bracket body and the lower bracket body are both in contact connection with the second sealing ring.

In terms of the gunsight, another technical solution adopted by the present invention is as follows. A gunsight includes a mirror body, a light source module arranged in the mirror body, and the chargeable gunsight bracket of the above another embodiment. The mirror body and the bracket body are connected and integrally molded, and the light source module is electrically connected to the power supply circuit board.

Further, the mirror body is fixedly connected to the upper bracket body.

Preferably, the mirror body and the upper bracket body are integrally molded.

Compared with the prior art, the gunsight in each of the above two technical solutions is fixedly mounted on the gun through the gunsight bracket, and the chargeable battery electrically connected to the power supply circuit board is mounted in the battery holder, so that the charging interface, the power supply circuit board and the chargeable battery form a chargeable and dischargeable power supply module. When the power of the chargeable battery is running out, the external power supply can directly charge the chargeable battery through the charging interface, so that the gunsight can be used continuously. In this process, it is unnecessary to disassemble the gunsight bracket or the battery mounting device of the gunsight, which not only saves the disassembly time, but also provides a greater convenience to the user without replacing the battery.

BRIEF DESCRIPTION OF THE DRAWINGS

In order to explain the technical solutions of the embodiments of the present invention more clearly, the drawings of the embodiments will be briefly introduced, and obviously, the drawings described below only relate to some embodiments of the present invention, rather than to limit the present invention.

DETAILED DESCRIPTION OF THE EMBODIMENTS

It needs to explain that the words "first", "second" and similar words used in the present invention do not indicate any order, number or importance, but are only used to distinguish different components. "Upper", "lower", "left", "right", "front", "rear", "top", "bottom" and the like used in the present invention are only used to express relative position relationships, and after the absolute position of the described object is changed, the relative position relationships can also be changed accordingly.

As described in the background, the aiming point or the aiming reticle of the existing sight is illuminated by LED, while the LED is powered by a battery, when the battery power runs out, the battery of the sight needs to be replaced, which unnecessarily wastes some time. Moreover, the battery of the existing sight is a button battery, which has a small capacity, resulting in that the sight's battery needs to be replaced frequently, and this brings many inconveniences to users. Thus, it is necessary to improve the existing sight.

In order to better describe the technical solutions of the present invention, the gunsight provided by the embodiments of the present invention will be described with reference to FIGS. 1 to 6.

Embodiment I

Figure 1:
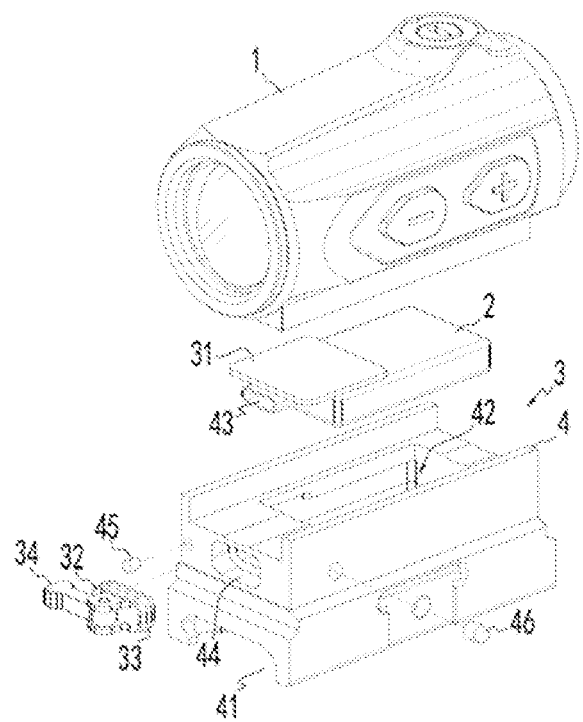
FIG. 1 is an exploded diagram of a structure of a gunsight in Embodiment I of the present invention.
Figure 2:
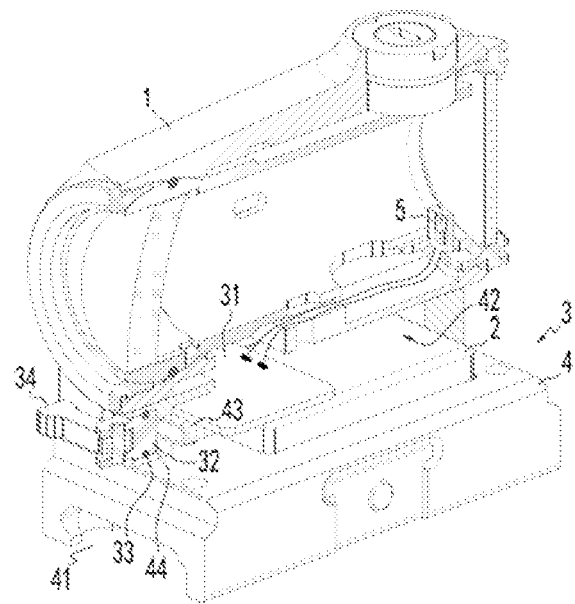
FIG. 2 is a partial sectional view of the structure of the gunsight in Embodiment I of the present invention.

As shown in FIG. 1 and FIG. 2, Embodiment I of the present invention provides a gunsight, which includes the mirror body 1 and the chargeable gunsight bracket 3. The chargeable gunsight bracket 3 includes the chargeable battery 2, the bracket body 4, and the power supply circuit board 31 electrically connected to the chargeable battery 2. A top of the bracket body 4 is used to be connected to the gunsight, a bottom of the bracket body 4 is provided with the groove 41 for receiving a guide rail of a gun, the bracket body 4 is further provided with the battery holder 42 for mounting the chargeable battery 2 and the charging interface 43 for being connected to an external power supply, and the battery holder 42 and the charging interface 43 are both located above the groove 41, so as to perform a charging operation. The power supply circuit board 31 and the chargeable battery 2 are both mounted in the battery holder 42, one end of the charging interface 43 is electrically connected to the power supply circuit board 31, and the other end of the charging interface 43 is communicated with an external environment, so that the charging interface 43, the power supply circuit board 31 and the chargeable battery 2 form a chargeable and dischargeable power supply module. The mirror body 1 is connected to the bracket body 4, and the mirror body 1 is located above the groove 41.

It can be understood that the above gunsight further includes the light source module 5 (referring to FIG. 2), the light source module 5 is mounted in the mirror body 1 and connected to the power supply circuit board 31 of the power supply module through a wire, so that the power supply module provides a stable power for the light source module 5 to emit light. The power supply circuit board 31 has a constant voltage-constant current module and a protection module for performing a charging management. The constant voltage-constant current module mainly provides a stable input for the chargeable battery 2, such as providing a constant voltage as the battery allowed. The protection module mainly performs three functions: an overcharge protection, an overdischarge protection and an over temperature protection, for example, when the power supply circuit board 31 detects that the battery is fully charged, the charging is stopped to prevent the battery from being overcharged.

After the above gunsight is fixedly mounted on the gun through the groove 41 and used for a period of time, when the power of the chargeable battery 2 is running out, for example, when the illumination brightness of the light source module 5 is becoming darker under the same illumination level, the chargeable battery 2 can be charged by inserting the charging plug connected to the external power supply into the charging interface 43, so that the gunsight can be used continuously. Even if it is used outdoors, the chargeable battery can be charged by a portable power source, so that the gunsight can be used continuously. In this process, it is unnecessary to disassemble the gunsight bracket or the battery mounting device of the gunsight, which not only saves the disassembly time, but also provides greater conveniences to users without replacing the battery. In addition, the structure of the above gunsight can use the chargeable battery 2 with a large capacity, and the endurance capability thereof is greatly improved as compared with the button battery commonly used in the existing gunsight, thus, the service time of the gunsight can be prolonged.

In the present embodiment, the charging interface 43 can be arranged as one of the following four common interfaces as needed: a micro USB interface, a Type-C interface, a 30-PIN interface and a lightning interface.

As shown in FIG. 1 and FIG. 2, in order to prevent moisture of the external environment from entering the interior of the power supply module, in the present embodiment, the bracket body 4 is further provided with the waterproof port 44 communicated with the external environment, and the charging interface 43 is communicated with the external environment through the waterproof port 44. The gunsight bracket 3 further includes the waterproof plug 32, and the waterproof plug 32 is inserted in the waterproof port 44 to prevent water from entering the charging interface 43. It should be noted that the waterproof plug 32 can be made of a rubber material or a silica gel material, so that when the waterproof plug 32 is inserted into the waterproof port 44, the rubber or silica gel deforms to prevent the waterproof port 44 from being communicated with the external environment, so as to prevent the moisture of the external environment from entering the interior of the power supply module through the charging interface 43, and the waterproof plug 32 is not easy to separate from the waterproof port 44. The waterproof plug 32 can also be made of hard materials such as a metal, a hard plastic and so forth, and the waterproof effect can also be achieved through the tight fitting between the waterproof plug 32 and the waterproof port 44. In order to ensure that not only the water can be prevented, but also the waterproof plug 32 is not easy to separate from the waterproof port 44 during use, the first sealing ring 33 is arranged on an outer surface of the waterproof plug 32, so that when the waterproof plug 32 is inserted into the waterproof port 44, the first sealing ring 33 deforms to prevent the communication between the waterproof port 44 and the external environment. In this way, the water of the external environment can be prevented from entering the power supply module through the charging interface 43, meanwhile, the friction between the waterproof plug 32 and the waterproof port 44 is also increased, so that the waterproof plug 32 is not easy to separate from the waterproof port 44.

As shown in FIG. 2, when the gunsight needs to be charged, the waterproof plug 32 needs to be pulled out to facilitate connecting the charging plug to the charging interface 43. In order to facilitate pulling out the waterproof plug 32, in the present embodiment, the waterproof plug 32 is provided with the handle 34, and the handle 34 extends out of the bracket body 4. It is very convenient to pull out the waterproof plug 32 by pulling a part of the handle 34 that extends out of the bracket body 4. It should be noted that the handle 34 can be made of a rope, a strip of cloth and other materials; the handle 34 can also be made of hard materials such as a metal, a hard plastic and so forth. At this time, one end of the handle 34 is connected to a surface of the waterproof plug 32 toward the external environment, and the other end of the handle 34 extends out of the bracket body 4.

Figure 3:
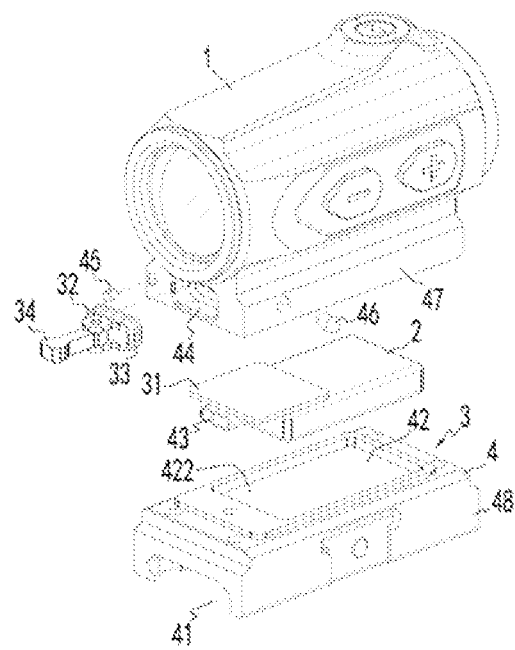
FIG. 3 is an exploded diagram of a structure of a gunsight in Embodiment II of the present invention (the gunsight is a red dot sight)
Figure 5:
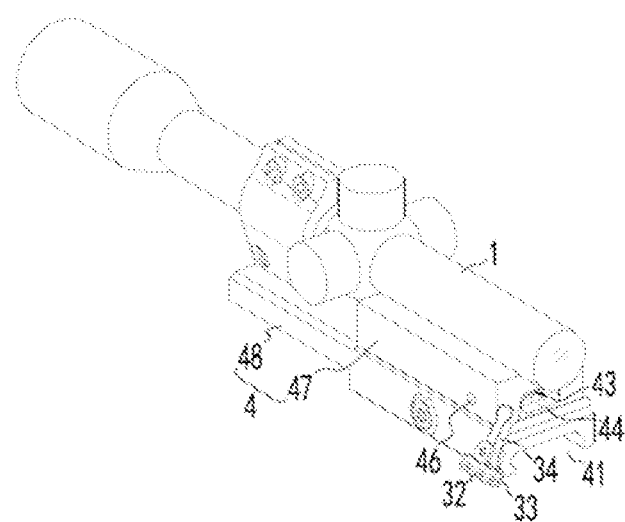
FIG. 5 is a schematic diagram showing connection mode I between a mirror body and a bracket body in Embodiment II of the present invention (the gunsight is a riflescope)

As shown in FIG. 1, in order to manage the handle 34, in the present embodiment, preferably, the handle 34 is made of a magnetic material (such as a ferrite material), one end of the handle 34 is hinged to a surface of the waterproof plug 32 toward the external environment, and the bracket body 4 is provided with the magnet 45 attracted by and connected to the other end of the handle 34. When charging is required, the end of the handle 34 attracted by the magnet 45 is pulled away from the magnet 45, and the waterproof plug 32 is pulled out through the handle 34 to facilitate inserting the charging plug (as shown in FIG. 3). After the waterproof plug 32 is pulled out, the handle 34 can be attracted on the magnet 45 to prevent losing the waterproof plug 32 (as shown in FIG. 5). After the charging is finished, the waterproof plug 32 is inserted into the waterproof port 44 again, and the handle 34 is rotated to make the part thereof extending out of the bracket body 4 be attracted with the magnet 45 again, so as to realize the management of the handle 34 (as shown in FIG. 2).

As shown in FIG. 1, in order to better indicate the charging process, in the present embodiment, the peripheral surface of the bracket body 4 is further provided with at least one LED lamp 46, and the LED lamp 46 is electrically connected to the power supply circuit board 31 for the reminding of the charging process. For example, when the power of the chargeable battery 2 is less than a certain threshold, the LED lamp 46 flashes; in the charging process, the LED lamp 46 is always on. Further, in order to realize more prompt functions, the LED lamp 46 is the two-color LED lamp 46 (such as the red-green LED lamp 46), and the following can be realized through the control of the power supply circuit board 31: when the power of the chargeable battery 2 is less than a certain threshold, a red lamp flashes; in the charging process, a green lamp flashes; after the full charging, the green lamp is always on; and after the charging plug is pulled up, the LED lamp 46 is off.

Embodiment II

As shown in FIGS. 3 to 6, the difference from Embodiment I is that the bracket body 4 of the gunsight bracket 3 includes the upper bracket body 47 and the lower bracket body 48, and the upper bracket body 47 and the lower bracket body 48 are detachably connected. For example, the upper bracket body 47 and the lower bracket body 48 are connected through a fastener, the charging interface 43, the waterproof port 44 and the waterproof plug 32 are all arranged on the upper bracket body 47, and the groove 41 is arranged on the lower bracket body 48. The battery holder 42 includes the upper holding chamber 421 and the lower holding chamber 422 respectively arranged on the upper bracket body 47 and the lower bracket body 48, the power supply circuit board 31 is mounted in the upper holding chamber 421, and the chargeable battery 2 is electrically connected to the power supply circuit board 31 and then mounted in the lower holding chamber 422. When the upper bracket body 47 and the lower bracket body 48 are connected, the upper holding chamber 421 covers the chargeable battery 2, which can further stabilize the chargeable battery 2 and prevent the battery from shifting. The connection mode between the mirror body 1 and the bracket body 4 includes:

Mode I

Figure 4:
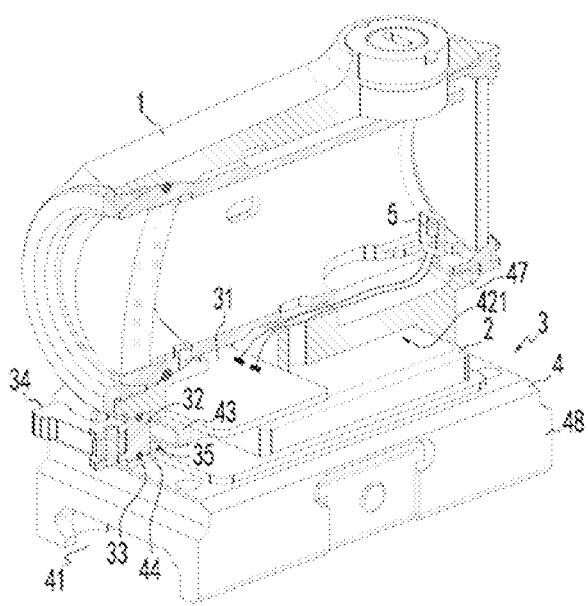
FIG. 4 is a partial sectional view of the structure of the gunsight in Embodiment II of the present invention (the gunsight is a red dot sight)
Figure 6:
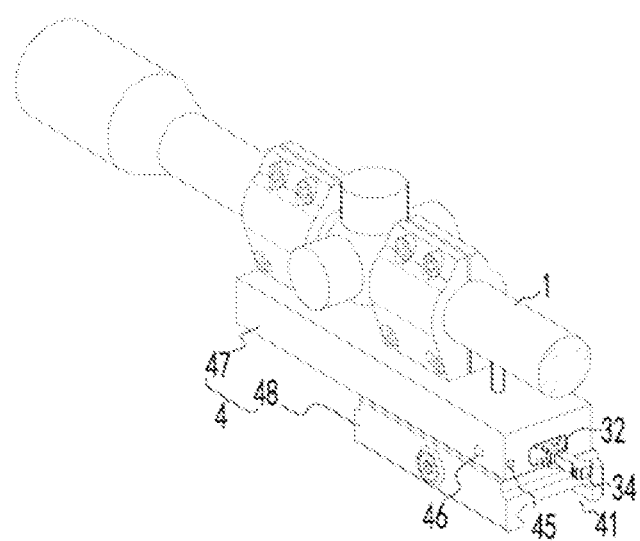
FIG. 6 is a schematic diagram showing connection mode II between the mirror body and the bracket body in Embodiment II of the present invention (the gunsight is a riflescope).

The mirror body 1 and the upper bracket body 47 are fixedly connected, including that the mirror body 1 and the upper bracket body 47 are fixedly connected through the fastener, or the mirror body 1 and the upper bracket body 47 are fixedly connected through welding, or the mirror body 1 and the upper bracket body 47 are fixedly connected through an adhesive, or the mirror body 1 and the upper bracket body 47 are integrally molded. As shown in FIG. 3 and FIG. 4, for the red dot sight, since a length of the mirror body 1 is relatively short and the integral molding of the mirror body 1 and the upper bracket body 47 can save the mounting time of the mirror body 1 and the upper bracket body 47, the structure that the mirror body 1 and the upper bracket body 47 are integrally molded is preferably adopted. As shown in FIG. 6, for the riflescope, since the length of the mirror body 1 is relatively long, it is suitable to adopt the structure that the mirror body 1 and the upper support body 47 are fixedly connected through the fastener.

Mode II

As shown in FIG. 5, the mirror body 1 and the lower bracket body 48 are fixedly connected, including that the mirror body 1 and the lower bracket body 48 are fixedly connected through the fastener, or combined combination of the fastener and the adhesive, or the mirror body 1 and the lower bracket body 48 are fixedly connected through welding. The connection mode included in Mode II is more suitable for the gunsight of which the length of the mirror body 1 is relatively long, such as the riflescope.

It should be noted that there is the second sealing ring 35 between the upper bracket body 47 and the lower bracket body 48, and the second sealing ring 35 surrounds the battery holder 42. When the upper bracket body 47 is connected to the lower bracket body 48, the upper bracket body 47 and the lower bracket body 48 are both in contact connection with the second sealing ring 35, so that the second sealing ring 35 deforms to prevent the water from entering the battery holder 42.

The above are only preferable embodiments of the present invention, but the present invention is not limited to the above embodiments. Any same or similar technical means to achieve the technical effect of the present invention should belong to the protection scope of the present invention.

What is claimed is:

1. A chargeable gunsight bracket, comprising:
   a bracket body for mounting a gunsight,
   a chargeable battery, and
   a power supply circuit board electrically connected to the chargeable battery;
   wherein
   a bottom of the bracket body is provided with a groove for receiving a guide rail of a gun,
   the bracket body comprises an upper bracket body and a lower bracket body, the upper bracket body and the lower bracket body are detachably connected, the bracket body is further provided with a battery holder and a charging interface, and the battery holder and the charging interface are both located above the groove,
   the battery holder comprises an upper holding chamber and a lower holding chamber, the upper holding chamber is arranged on the upper bracket body, the lower holding chamber is arranged on the lower bracket body, the charging interface is arranged on the upper bracket body, the groove is arranged on the lower bracket body, the power supply circuit board is mounted in the upper holding chamber of the battery holder, and the chargeable battery is mounted in the lower holding chamber of the battery holder,
   a first end of the charging interface is electrically connected to the power supply circuit board, and a second end of the charging interface is communicated with an external environment for connecting to an external power supply.

2. The chargeable gunsight bracket of claim 1, wherein the bracket body is further provided with a waterproof port communicated with the external environment, the charging interface is communicated with the external environment through the waterproof port, the chargeable gunsight bracket further comprises a waterproof plug, and the waterproof plug is inserted into the waterproof port to prevent water from entering the charging interface
   wherein the waterproof plug is provided with a handle, and the handle extends out of the bracket body to facilitate pulling out the waterproof plug.

3. The chargeable gunsight bracket of claim 2, wherein an outer surface of the waterproof plug is provided with a first sealing ring, and the waterproof plug is connected to the waterproof port through the first sealing ring.

4. The chargeable gunsight bracket of claim 2, wherein the handle is made of a magnetic material, a first end of the handle is hinged to a surface of the waterproof plug toward the external environment, and the bracket body is provided with a magnet attracted by and connected to a second end of the handle.

5. The chargeable gunsight bracket of claim 1, wherein the chargeable gunsight bracket further comprises a second sealing ring surrounding the battery holder, the second sealing ring is located between the upper bracket body and the lower bracket body, and when the upper bracket body is connected to the lower bracket body, the upper bracket body and the lower bracket body are both in contact connection with the second sealing ring.

6. A gunsight, comprising:
   a mirror body,
   a light source module arranged in the mirror body, and
   the chargeable gunsight bracket of claim 1;
   wherein
   the mirror body is connected to the bracket body, and the light source module is electrically connected to the power supply circuit board.

7. The gunsight of claim 6, wherein the mirror body is fixedly connected to the upper bracket body.

8. The gunsight of claim 6, wherein the mirror body and the upper bracket body are integrally molded.

9. The chargeable gunsight bracket of claim 2, wherein the chargeable gunsight bracket further comprises a second sealing ring surrounding the battery holder, the second sealing ring is located between the upper bracket body and the lower bracket body, and when the upper bracket body is connected to the lower bracket body, the upper bracket body and the lower bracket body are both in contact connection with the second sealing ring.

10. The chargeable gunsight bracket of claim 3, wherein the chargeable gunsight bracket further comprises a second sealing ring surrounding the battery holder, the second sealing ring is located between the upper bracket body and the lower bracket body, and when the upper bracket body is connected to the lower bracket body, the upper bracket body and the lower bracket body are both in contact connection with the second sealing ring.

11. The chargeable gunsight bracket of claim 4, wherein the chargeable gunsight bracket further comprises a second sealing ring surrounding the battery holder, the second sealing ring is located between the upper bracket body and the lower bracket body, and when the upper bracket body is connected to the lower bracket body, the upper bracket body and the lower bracket body are both in contact connection with the second sealing ring.

12. The gunsight of claim 6, wherein the bracket body is further provided with a waterproof port communicated with the external environment, the charging interface is communicated with the external environment through the waterproof port, the chargeable gunsight bracket further comprises a waterproof plug, and the waterproof plug is inserted into the waterproof port to prevent water from entering the charging interface.

13. The gunsight of claim 12, wherein an outer surface of the waterproof plug is provided with a first sealing ring, and the waterproof plug is connected to the waterproof port through the first sealing ring.

14. The gunsight of claim 12, wherein the handle is made of a magnetic material, a first end of the handle is hinged to a surface of the waterproof plug toward the external environment, and the bracket body is provided with a magnet attracted by and connected to a second end of the handle.

15. The gunsight of claim 6, wherein the chargeable gunsight bracket further comprises a second sealing ring surrounding the battery holder, the second sealing ring is located between the upper bracket body and the lower bracket body, and when the upper bracket body is connected to the lower bracket body, the upper bracket body and the lower bracket body are both in contact connection with the second sealing ring.

\* \* \* \* \*